(12) United States Patent
Huang et al.

(10) Patent No.: US 11,264,886 B1
(45) Date of Patent: Mar. 1, 2022

(54) CONTROL CIRCUIT AND CONTROL METHOD FOR POWER CONVERTER

(71) Applicant: National Taiwan University of Science and Technology, Taipei (TW)

(72) Inventors: Chien-Chun Huang, Taoyuan (TW); Huang-Jen Chiu, New Taipei (TW)

(73) Assignee: National Taiwan University of Science and Technology, Taipei (TW)

(*) Notice: Subject to any disclaimer, the term of this patent is extended or adjusted under 35 U.S.C. 154(b) by 0 days.

(21) Appl. No.: 17/148,530

(22) Filed: Jan. 13, 2021

(30) Foreign Application Priority Data

Aug. 21, 2020 (TW) .................................. 109128519

(51) Int. Cl.
| | |
|---|---|
| *H02M 1/08* | (2006.01) |
| *H02M 7/217* | (2006.01) |
| *H02M 3/00* | (2006.01) |
| *H02M 1/00* | (2006.01) |
| *H02M 3/158* | (2006.01) |
| *H02M 3/07* | (2006.01) |

(52) U.S. Cl.
CPC ............ *H02M 1/083* (2013.01); *H02M 3/01* (2021.05); *H02M 7/217* (2013.01); *H02M 1/0009* (2021.05); *H02M 1/0048* (2021.05); *H02M 1/0058* (2021.05); *H02M 3/07* (2013.01); *H02M 3/1588* (2013.01)

(58) Field of Classification Search
CPC .... H02M 1/083; H02M 7/217; H02M 1/0009; H02M 1/0048; H02M 1/0058; H02M 1/0095; H02M 3/01; H02M 3/1588; H02M 3/33569; H02M 3/3376
See application file for complete search history.

(56) References Cited

U.S. PATENT DOCUMENTS

| | | | | |
|---|---|---|---|---|
| 9,054,576 B2* | 6/2015 | Kang | ...................... | H02M 3/07 |
| 9,831,776 B1* | 11/2017 | Jiang | .................... | H02M 3/158 |
| 9,917,517 B1* | 3/2018 | Jiang | ...................... | H02M 3/07 |
| 10,122,256 B1* | 11/2018 | Babazadeh | ........... | H02M 1/083 |
| 10,166,873 B2 | 1/2019 | Kardolus et al. | | |
| 10,199,928 B1* | 2/2019 | Wiedenbauer | ...... | H02M 7/4837 |

(Continued)

FOREIGN PATENT DOCUMENTS

| | | |
|---|---|---|
| CN | 105917565 B | 1/2020 |
| EP | 2479059 A1 | 7/2012 |

(Continued)

*Primary Examiner* — Yusef A Ahmed
(74) *Attorney, Agent, or Firm* — Li & Cai Intellectual Property Office

(57) ABSTRACT

A control circuit and a control method for a power converter are provided. The power converter includes a plurality of resonant tanks and a plurality of switches disposed between an input terminal and an output terminal. The switches correspond to a first mode and a second mode, respectively, and the control circuit includes a first switch control circuit, a first zero current detection circuit, a second zero current detection circuit, a first switch off detector, a modulation time calculation module, a second switch control circuit, a third zero current detection circuit, a fourth zero current detection circuit, and a second switch off detector. The control circuit uses a plurality of zero current detection circuits to perform time modulations on a plurality of rectifier switches in the switches.

10 Claims, 6 Drawing Sheets

(56) References Cited

U.S. PATENT DOCUMENTS

| | | | |
|---|---|---|---|
| 10,224,803 B1* | 3/2019 | Rainer | H02M 1/083 |
| 10,523,115 B2* | 12/2019 | Scheel | H02M 3/073 |
| 10,608,530 B1* | 3/2020 | Zhu | H02M 3/335 |
| 10,651,731 B1* | 5/2020 | Rainer | H02M 3/1588 |
| 10,778,098 B2* | 9/2020 | Yang | H02M 7/4837 |
| 11,011,991 B1* | 5/2021 | Mercer | H02M 1/0048 |
| 2007/0200538 A1* | 8/2007 | Tang | H02M 3/158 |
| | | | 323/237 |
| 2008/0298093 A1* | 12/2008 | Jin | H02M 3/285 |
| | | | 363/21.06 |
| 2012/0223583 A1* | 9/2012 | Cooley | H02M 3/07 |
| | | | 307/82 |
| 2016/0056640 A1* | 2/2016 | Mao | H02J 50/80 |
| | | | 307/104 |
| 2018/0248489 A1* | 8/2018 | Wang | H02M 3/33507 |
| 2019/0334379 A1* | 10/2019 | Lee | H02J 50/12 |
| 2019/0334434 A1* | 10/2019 | Jong | H02M 3/073 |
| 2019/0356149 A1* | 11/2019 | Li | H02M 3/1588 |
| 2020/0153346 A1* | 5/2020 | Li | H02M 3/337 |
| 2020/0153347 A1* | 5/2020 | Li | H02M 3/33569 |
| 2020/0186028 A1* | 6/2020 | Cheng | H02M 3/07 |
| 2020/0186039 A1* | 6/2020 | Cheng | H02M 3/07 |
| 2020/0204070 A1* | 6/2020 | Schwabe | H02M 3/06 |
| 2021/0184571 A1* | 6/2021 | Sblano | H02M 1/0095 |

FOREIGN PATENT DOCUMENTS

| | | |
|---|---|---|
| EP | 3002149 A1 | 4/2016 |
| TW | 201916566 A | 4/2019 |

* cited by examiner

CONTROL CIRCUIT AND CONTROL METHOD FOR POWER CONVERTER

CROSS-REFERENCE TO RELATED PATENT APPLICATION

This application claims the benefit of priority to Taiwan Patent Application No. 109128519, filed on Aug. 21, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a control circuit and a control method, and more particularly to a control circuit and a control method for a power converter.

BACKGROUND OF THE DISCLOSURE

In the existing switching resonant tank converter circuit, it has only been proposed to automatically adjust on-times to individually control the off timing of rectifier switches, to achieve optimal efficiency. However, in parallel applications, no solution is proposed for the current sharing between multiple sets of converters.

Therefore, one of the important issues in the art is how to improve a control mechanism to retain existing automatic adjustment of on-time control, such that an overall converter can be optimized in terms of efficiency, with the output voltage and output impedance being adjustable, and parallel outputs can be balanced.

SUMMARY OF THE DISCLOSURE

In response to the above-referenced technical inadequacies, the present disclosure provides a control circuit and a control method for a power converter.

In one aspect, the present disclosure provides a control method for a power converter including a plurality of resonant tanks and a plurality of switches arranged between an input terminal and an output terminal. The plurality of switches correspond to a first mode and a second mode, respectively, and the input terminal receives an input voltage. The control method includes: configuring a first switch control circuit to control the plurality of switches corresponding to the first mode to be turned on in the first mode, to respectively form a first resonant current along a first resonant path and a second resonant current along a second resonant path through the plurality of resonant tanks, in which the plurality of switches include a first rectifier switch located on the first resonant path and a second rectifier switch located on the second resonant path; configuring a first zero current detection circuit to detect the first resonant current on the first rectifier switch, and output, in response to detecting that the first resonant current reaches zero amp, a first zero current signal to enable the first switch control circuit to control the first rectifier switch to be turned off; configuring a second zero current detection circuit to detect the second resonant current on the second rectifier switch, and output, in response to detecting that the second resonant current reaches zero amp, a second zero current signal to enable the first switch control circuit to control the second rectifier switch to be turned off; configuring a first switch off detector to detect whether or not the first rectifier switch and the second rectifier switch are both turned off, and output, in response to the first rectifier switch and the second rectifier switch being both turned off, a first turn-off confirmation signal; configuring a modulation time calculation module to calculate a first modulation time according to a feedback voltage from the output terminal, and output, in response to receiving the first turn-off confirmation signal, a second mode activation signal after the first rectifier switch and the second rectifier switch are turned off and the first modulation time has elapsed; configuring a second switch control circuit to, in response to receiving the second mode activation signal, control the plurality of switches corresponding to the second mode to be turned on, to respectively form a third resonant current along a third resonant path and a fourth resonant current along a fourth resonant path through the plurality of resonant tanks, in which the plurality of switches include a third rectifier switch located on the third resonant path and a fourth rectifier switch located on the fourth resonant path; configuring a third zero current detection circuit to detect the third resonant current on the third rectifier switch, and output, in response to detecting that the third resonant current reaches zero amp, a third zero current signal to enable the second switch control circuit to control the first rectifier switch to be turned off; configuring a fourth zero current detection circuit to detect the fourth resonant current on the fourth rectifier switch, and output, in response to detecting that the second resonant current reaches zero amp, a fourth zero current signal to enable the second switch control circuit to control the fourth rectifier switch to be turned off; configuring a second switch off detector to detect whether or not the third rectifier switch and the fourth rectifier switch are both turned off, and output, in response to the third rectifier switch and the fourth rectifier switch being both turned off, a second turn-off confirmation signal; and configuring the modulation time calculation module to calculate a second modulation time according to the feedback voltage from the output terminal, and output, in response to receiving the second turn-off confirmation signal, a first mode activation signal after the third rectifier switch and the fourth rectifier switch are turned off and the second modulation time has elapsed.

In certain embodiments, the control method further includes configuring the first switch control circuit to, in response to receiving the first turn-off confirmation signal, control the switches other than the first rectifier switch and the second rectifier switch among the plurality of switches corresponding to the first mode to be turned off within the first modulation time after the first rectifier switch and the second rectifier switch are turned off.

In certain embodiments, the control method further includes configuring the second switch control circuit to, in response to receiving the second turn-off confirmation signal, control the switches other than the third rectifier switch and the fourth rectifier switch among the plurality of switches corresponding to the second mode to be turned off within the second modulation time after the third rectifier switch and the fourth rectifier switch are turned off.

In certain embodiments, the modulation time calculation module includes a first calculation unit and a second calculation unit. The control method further includes: configuring the first calculation unit to calculate the first modulation time according to the feedback voltage, and output, in response to receiving the first turn-off confirmation signal, the second mode activation signal after the first rectifier switch and the second rectifier switch are turned off and the first modulation time has elapsed; and configuring the second calculation unit to calculate the second modulation time according to the feedback voltage, and output, in response to receiving the second turn-off confirmation signal, the first mode activation signal after the third rectifier switch and the fourth rectifier switch are turned off and the second modulation time has elapsed.

In certain embodiments, the modulation time calculation module includes a third calculation unit and a phase shifter. The control method further includes: configuring the third calculation unit to calculate a total modulation time according to the feedback voltage, correspondingly generate a time modulation signal, and output, in response to receiving the first turn-off confirmation signal or the second turn-off confirmation signal, the time modulation signal with the calculated total modulation time; and configuring the phase shifter to, in response to receiving the time modulation signal, phase-shift the time modulation signal according to one-half of the total modulation time to generate a phase-shifted time modulation signal, and use the time modulation signal and the phase-shifted time modulation signal as the second mode activation signal and the first mode activation signal to be output, respectively.

In another aspect, the present disclosure provides a control circuit for a power converter including a plurality of resonant tanks and a plurality of switches arranged between an input terminal and an output terminal. The plurality of switches correspond to a first mode and a second mode, respectively, and the input terminal receives an input voltage. The control circuit includes a first switch control circuit, a first zero current detection circuit, a second zero current detection circuit, a first switch off detector, a modulation time calculation module, a second switch control circuit, a third zero current detection circuit, a fourth zero current detection circuit, and a second switch off detector. The first switch control circuit is configured to control the plurality of switches corresponding to the first mode to be turned on in the first mode, to respectively form a first resonant current along a first resonant path and a second resonant current along a second resonant path through the plurality of resonant tanks. The plurality of switches include a first rectifier switch located on the first resonant path and a second rectifier switch located on the second resonant path. The first zero current detection circuit is configured to detect the first resonant current on the first rectifier switch, and output, in response to detecting that the first resonant current reaches zero amp, a first zero current signal to enable the first switch control circuit to control the first rectifier switch to be turned off. The second zero current detection circuit is configured to detect the second resonant current on the second rectifier switch, and output, in response to detecting that the second resonant current reaches zero amp, a second zero current signal to enable the first switch control circuit to control the second rectifier switch to be turned off. The first switch off detector is configured to detect whether or not the first rectifier switch and the second rectifier switch are both turned off, and output, in response to the first rectifier switch and the second rectifier switch being both turned off, a first turn-off confirmation signal. The modulation time calculation module is configured to calculate a first modulation time according to a feedback voltage from the output terminal, and output, in response to receiving the first turn-off confirmation signal, a second mode activation signal after the first rectifier switch and the second rectifier switch are turned off and the first modulation time has elapsed. The second switch control circuit is configured to, in response to receiving the second mode activation signal, control the plurality of switches corresponding to the second mode to be turned on, to respectively form a third resonant current along a third resonant path and a fourth resonant current along a fourth resonant path through the plurality of resonant tanks. The plurality of switches include a third rectifier switch located on the third resonant path and a fourth rectifier switch located on the fourth resonant path. The third zero current detection circuit is configured to detect the third resonant current on the third rectifier switch, and output, in response to detecting that the third resonant current reaches zero amp, a third zero current signal to enable the second switch control circuit to control the third rectifier switch to be turned off. The fourth zero current detection circuit is configured to detect the fourth resonant current on the fourth rectifier switch, and output, in response to detecting that the second resonant current reaches zero amp, a fourth zero current signal to enable the second switch control circuit to control the fourth rectifier switch to be turned off. The second switch off detector is configured to detect whether or not the third rectifier switch and the fourth rectifier switch are both turned off, and output, in response to the third rectifier switch and the fourth rectifier switch being both turned off, a second turn-off confirmation signal. The modulation time calculation module is configured to calculate a second modulation time according to the feedback voltage from the output terminal, and output, in response to receiving the second turn-off confirmation signal, a first mode activation signal after the third rectifier switch and the fourth rectifier switch are turned off and the second modulation time has elapsed.

Therefore, the control circuit and the control method for the power converter provided by the present disclosure can enable rectifier switches of a power converter that has multiple sets of rectification paths to determine on-times individually through the zero current detection circuits. The control circuit and the control method provided by the present disclosure can not only overcome differences in on-times of the rectifier switches caused by the component error of each individual rectifier loop, but can also achieve functions of zero voltage turned on and zero current turned off for each of the rectifier components, thereby optimizing an overall efficiency of the power converter.

In addition, after ensuring that all rectification paths of the power converter have completed zero current turn-off, trigger timings of the switching signals of the power converter are adjusted to achieve modulation of the converter output impedance, thereby achieving functions of output voltage adjustment and current-sharing for parallel output.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings in which.

DETAILED DESCRIPTION OF THE EXEMPLARY EMBODIMENTS

Figure 1:
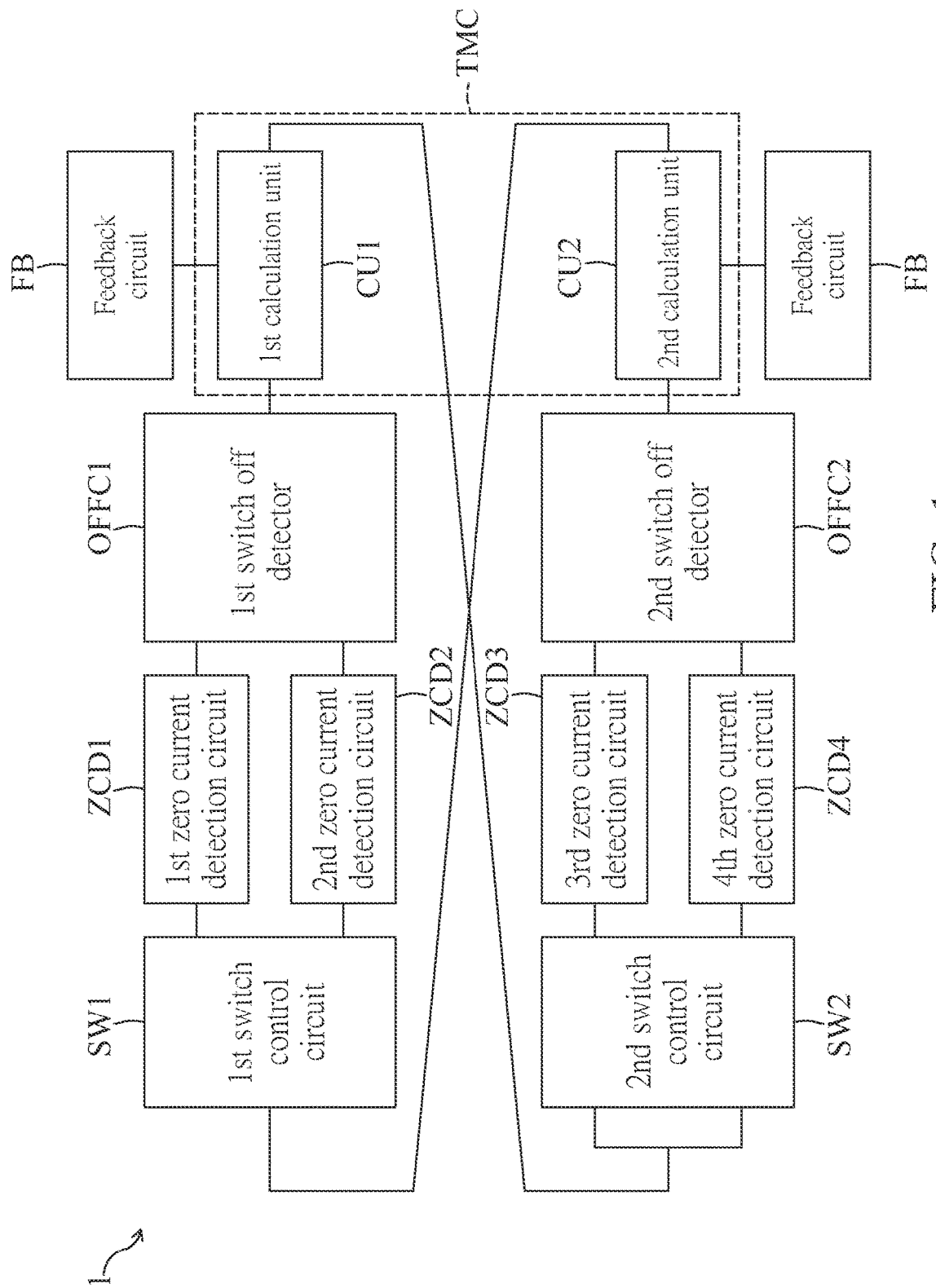
FIG. 1 is a functional block diagram of a control circuit for a power converter according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
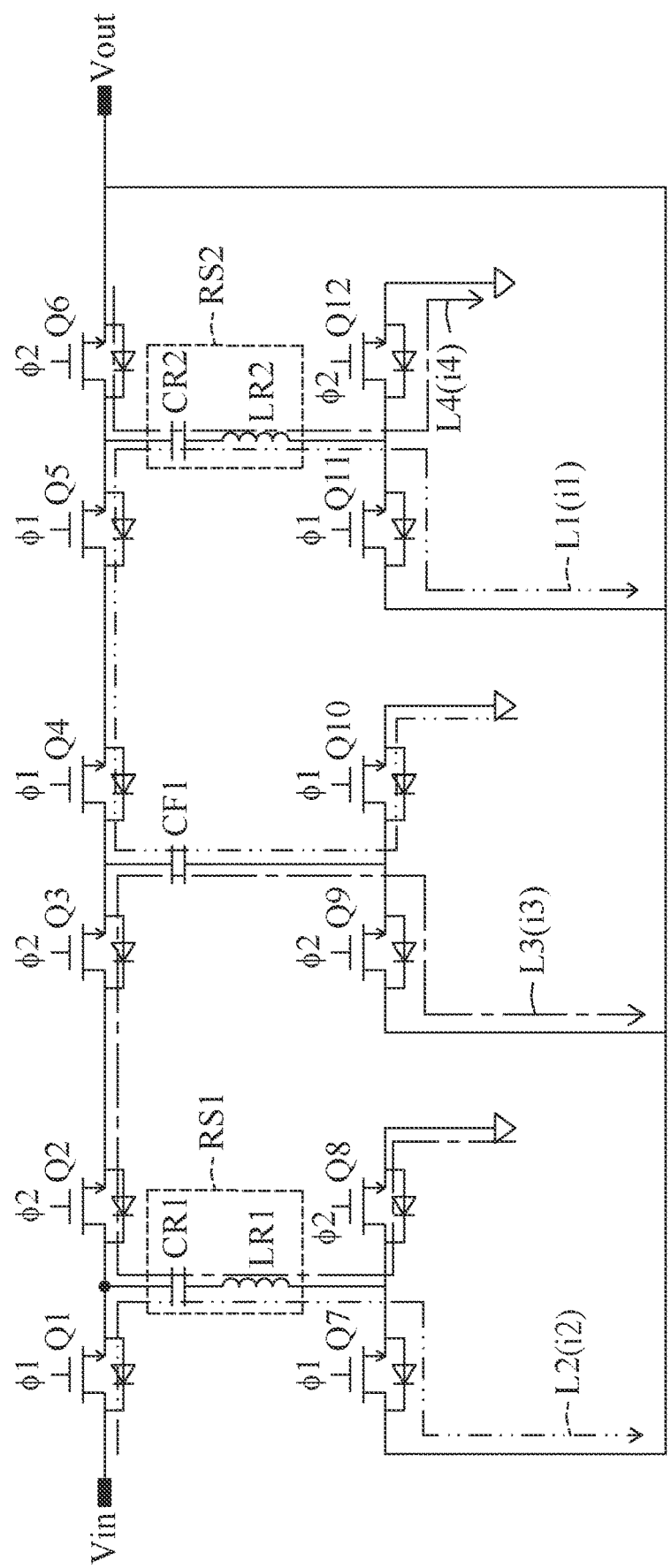
FIG. 2 is a circuit layout of the power converter according to the first embodiment of the present disclosure.

FIG. 1 is a functional block diagram of a control circuit for a power converter according to a first embodiment of the present disclosure. Referring to FIG. 1, the first embodiment of the present disclosure provides a control circuit for a power converter, and further reference can be made to FIG. 2, which is a circuit layout of the power converter according to the first embodiment of the present disclosure. As shown in FIG. 2, the power converter can be a switched tank converter (STC), which includes resonant tanks RS1 and RS2 and switches Q1 to Q12 provided between an input terminal Vin and an output terminal Vout. The switches Q1 to Q12 can respectively correspond to a first mode Φ1 and a second mode Φ2, and the input terminal Vin receives an input voltage. The resonant tank RS1 can include a resonant capacitor CR1 and a resonant inductor LR1. The resonant tank RS2 can include a resonant capacitor CR2 and a resonant inductor LR2. A non-resonant capacitor CF1 is separate from the resonant tanks RS1 and RS2, and is a capacitor that does not contribute to characteristic resonant frequencies of the resonant tanks RS1 and RS2 themselves. In this embodiment, only one non-resonant capacitor CF1 is included in the circuit. However, depending on topology of the STC circuit, more than one non-resonant capacitor can be used. In a specific switching state, depending on the circuit topology and application, each resonant tank RS1 and RS2 can be connected in series or in parallel with a specific non-resonant capacitor.

Each of the plurality of switches Q1 to Q12 has a first terminal, a second terminal, a control terminal, and a corresponding body diode. The control terminal can receive a control signal so that the switch is in off or on state. In the embodiment of FIG. 1, N-channel MOSFET switches are utilized. However, other types of switches can also be used. Among the switches Q1 to Q12, the switches Q1, Q4, Q5, Q7, Q10, and Q11 correspond to the first mode Φ1, and the switches Q2, Q3, Q6, Q8, Q9, and Q12 correspond to the second mode Φ2.

The control circuit 1 of the present disclosure is further described. As shown in FIG. 1, the control circuit 1 includes a first switch control circuit SW1, a first zero current detection circuit ZCD1, a second zero current detection circuit ZCD2, a first switch off detector OFFC1, a modulation time calculation module TMC, a second switch control circuit SW2, a third zero current detection circuit ZCD3, a fourth zero current detection circuit ZCD4, and a second switch off detector OFFC2.

Figure 3:
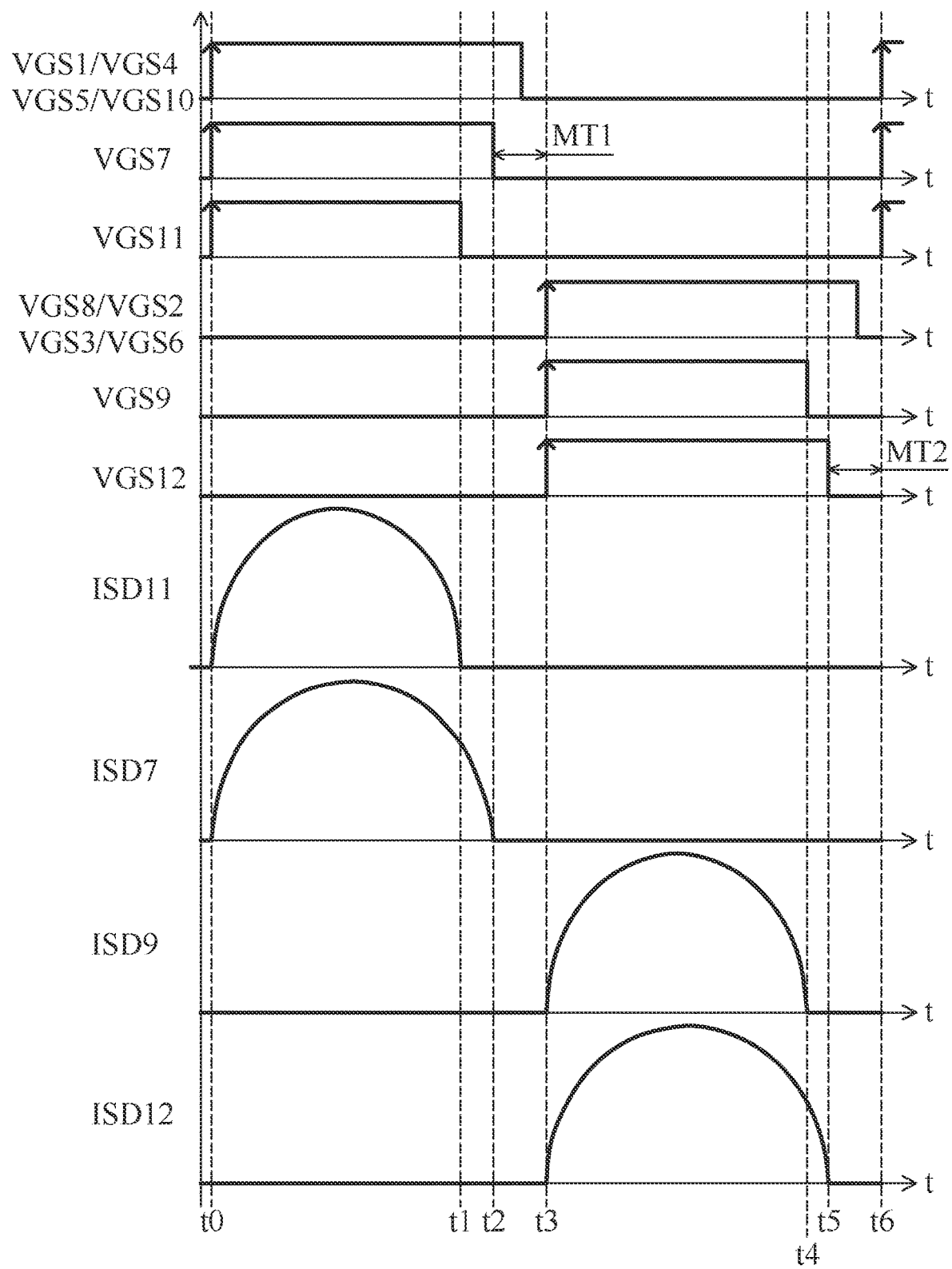
FIG. 3 is a switch timing diagram according to the first embodiment of the present disclosure.

The details of each part of the control circuit 1 will be described hereinafter based on FIG. 3. Reference is made to FIG. 3, which is a switch timing diagram according to the first embodiment of the present disclosure.

As shown in FIG. 3, the first mode Φ1 starts at time t0, and the first switch control circuit SW1 is configured to control the plurality of switches corresponding to the first mode Φ1 to be turned on in the first mode Φ1. For example, the switches Q1, Q4, Q5, Q7, Q10, and Q11 are controlled by switching signals VGS1, VGS4, VGS5, VGS7, VGS10, and VGS11, respectively, and the switches Q2, Q3, Q6, Q8, Q9 and Q12 corresponding to the second mode Φ2 are controlled by switching signals VGS2, VGS3, VGS6, VGS8, VGS9 and VGS12. In this case, a first resonant current i1 along the first resonant path L1 and a second resonant current i2 along the second resonant path L2 can be formed by the resonant tanks RS1 and RS2, respectively.

The switches Q1, Q4, Q5, Q7, Q10, and Q11 include a first rectifier switch located on the first resonance path L1, and a second rectifier switch located on the second resonance path L2. For example, it can be seen from FIG. 3 that the body diodes of the switches Q11 and Q7 follow a direction of the current, and therefore have a rectifying function, which can be used as the aforementioned first rectifier switch and second rectifier switch, respectively. In the first resonance path L1, the switch Q10 can also be used as the first rectifier switch, but the switch Q11 is used here in this embodiment.

Next, the first zero current detection circuit ZCD1 is configured to detect the first resonant current i1 on the first rectifier switch (the switch Q11 at this time), that is, to detect a switch current ISD11 on the switch Q11. In response to the first resonant current i1 (i.e., the switch current ISD11) being detected to reach zero amp, the first zero current detection circuit ZCD1 outputs a first zero current signal to enable the first switch control circuit SW1 to control the first rectifier switch (switch Q11) to be turned off, which is at time t1.

At the same time, when the second resonant path L2 is generated, the second zero current detection circuit ZCD2 is also configured to detect the second resonant current i2 on the second rectifier switch (in this case, the switch Q7), in other words, to detect a switch current ISD7 on the switch Q7. In response to the second resonant current i2 being detected to reach zero amp, the second zero current detection circuit ZCD2 outputs a second zero current signal to enable the first switch control circuit SW1 to control the second rectifier switch (switch Q7) to be turned off, and it is at time t2.

The reason for using the first zero current detection circuit ZCD1 and the second zero current detection circuit ZCD2 for detection is that the resonance tanks RS1 and RS2 of the power converter may not match with each other, resulting in different resonance frequencies. Therefore, in order for the first resonant path L1 and the second resonant path L2 to individually operate at the resonant frequency, the most efficient manner is to configure the first zero-current detection circuit ZCD1 and the second zero-current detection circuit ZCD2 to detect on-times respectively required by the switches Q11 and Q7, and then control the first switch control circuit SW1.

Further, the first switch off detector OFFC1 is configured to detect whether or not the first rectifier switch and the second rectifier switch are both turned off. At time t2, when it is detected that both the first rectifier switch (switch Q11) and the second rectifier switch (switch Q7) are turned off, the first turn-off confirmation signal is outputted.

Next, the modulation time calculation module TMC is configured to calculate the first modulation time MT1 based on a feedback voltage from the output terminal Vout. For example, the output terminal Vout can be connected to a feedback circuit FB to transmit the feedback voltage of the output terminal Vout to the modulation time calculation module TMC. If the output voltage is too high, a longer first modulation time MT1 will be calculated and used to decrease the output voltage, and if the output voltage is too low, a shorter first modulation time MT1 is calculated to increase the output voltage. In this embodiment, the feedback voltage can be compared with a predetermined voltage, and an error between the two can be converted into a length of the first modulation time MT1 through a compensator. During the first modulation time MT1, the first rectifier switch (switch Q11) and the second rectifier switch (switch Q7) are both in the off state.

For the switches Q1, Q4, Q5, Q10 other than the first rectifier switch (switch Q11) and the second rectifier switch (switch Q7) among the switches Q1, Q4, Q5, Q7, Q10, and Q11 corresponding to the first mode Φ1, the first switch control circuit SW1 can be controlled by a fixed control method. The first switch control circuit SW1 can be configured to, in response to receiving the first turn-off confirmation signal, control the switches Q1, Q4, Q5, and Q10 to be turned off within the first modulation time MT1 after the first rectifier switch (switch Q11) and the second rectifier switch (switch Q7) are turned off.

In addition, in response to receiving the first turn-off confirmation signal, after the first rectifier switch (switch Q11) and the second rectifier switch (switch Q7) are turned off, and after the first modulation time MT1 has elapsed, the modulation time calculation module TMC can output a second mode activation signal, and it is at time t3.

At time t3, the second switch control circuit SW2 is configured to, in response to receiving the second mode activation signal, control the switches Q2, Q3, Q6, Q8, Q9, and Q12 corresponding to the second mode Φ2 to be turned on, to respectively form a third resonance current i3 along a third resonance path L3 and a fourth resonance current i4 along a fourth resonance path L4 through the resonant tanks RS1 and RS2. Similarly, switches Q2, Q3, Q6, Q8, Q9, and Q12 include a third rectifier switch (in this case, switch Q9) located on the third resonant path L3 and a fourth rectifier switch located on the fourth resonant path L4 (in this case, switch Q12).

Next, the third zero current detection circuit ZCD3 is configured to detect the third resonant current i3 on the third rectifier switch (the switch Q9), in other words, to detect a switch current ISD9 on the switch Q9. In response to the third resonant current i3 (i.e., the switch current ISD9) being detected to reach zero amp, the third zero current detection circuit ZCD3 outputs a third zero current signal to enable the second switch control circuit SW2 to control the third rectifier switch (switch Q9) to be turned off, and it is at time t4.

At the same time, when the fourth resonant path L4 is generated, the fourth zero current detection circuit ZCD4 is configured to detect a fourth resonant current i4 (that is, the switch current ISD12) on the fourth rectifier switch (switch Q12). In response to the fourth resonant current i4 (switching current ISD12) being detected to reach zero amp, the fourth zero current detection circuit ZCD4 outputs a fourth zero current signal to enable the second switch control circuit SW2 to control the fourth rectifier switch (switch Q12) to be turned off, and it is at time t5. Similarly, the most efficient manner is to configure the third zero current detection circuit ZCD3 and the fourth zero current detection circuit ZCD4 to detect the on-times of the switches Q9 and Q12 individually required to control the second switch control circuit SW2.

Further, the second switch off detector OFFC2 is configured to detect whether or not the third rectifier switch and the fourth rectifier switch are both turned off. When the third rectifier switch and the fourth rectifier switch are both turned off, a second turn-off confirmation signal is outputted. At time t5, when it is detected that both the third rectifier switch (switch Q9) and the fourth rectifier switch (switch Q12) are turned off, the second turn-off confirmation signal is output.

Next, the modulation time calculation module TMC is further configured to calculate the second modulation time MT2 based on the feedback voltage from the output terminal Vout. For example, the output terminal Vout can be connected to the feedback circuit FB to transmit the feedback voltage of the output terminal Vout to the modulation time calculation module TMC. If the output voltage is too high, a longer second modulation time MT2 will be calculated and used to decrease the output voltage, and if the output voltage is too low, a shorter second modulation time MT2 is calculated to increase the output voltage. In this embodiment, the feedback voltage can be compared with a predetermined voltage, and an error between the two can be converted into a length of the second modulation time MT2 through the compensator. During the second modulation time MT2, the third rectifier switch (switch Q9) and the fourth rectifier switch (switch Q12) are both in the off state.

In addition, in response to receiving the second turn-off confirmation signal, after the third rectifier switch (switch Q9) and the fourth rectifier switch (switch Q12) are turned off, and after the second modulation time MT2 has elapsed, the modulation time calculation module TMC can output the first mode activation signal, and the power converter circuit is periodically driven in the manner of the aforementioned first mode.

For the switches Q2, Q3, Q6, and Q8 other than the third rectifier switch (switch Q9) and the fourth rectifier switch (switch Q12) among the switches Q2, Q3, Q6, Q8, Q9, and Q12 corresponding to the second mode Φ2, the second switch control circuit SW2 can be controlled by a fixed control method. The second switch control circuit SW2 can be configured to, in response to receiving the first turn-off confirmation signal, control the switches Q2, Q3, Q6, and Q8 to be turned off within the second modulation time MT2 after the third rectifier switch (switch Q9) and the fourth rectifier switch (switch Q12) are turned off.

In this embodiment, the modulation time calculation module TMC can include a first calculation unit CU1 and a second calculation unit CU2 to calculate the required modulation time in the first mode Φ1 and the second mode Φ2, respectively. The first calculation unit CU1 is configured to calculate the first modulation time MT1 according to the feedback voltage, and output, in response to receiving the first turn-off confirmation signal, the second mode activation signal after the first rectifier switch (switch Q11) and the second rectifier switch (switch Q7) are turned off and the first modulation time MT1 has elapsed.

Similarly, the second calculation unit CU2 is configured to calculate the second modulation time MT2 according to the feedback voltage, and output, in response to receiving the second turn-off confirmation signal, the first mode activation signal after the third rectifier switch (switch Q9) and the fourth rectifier switch (switch Q12) are turned off and the second modulation time MT2 has elapsed.

Second Embodiment

Figure 4:
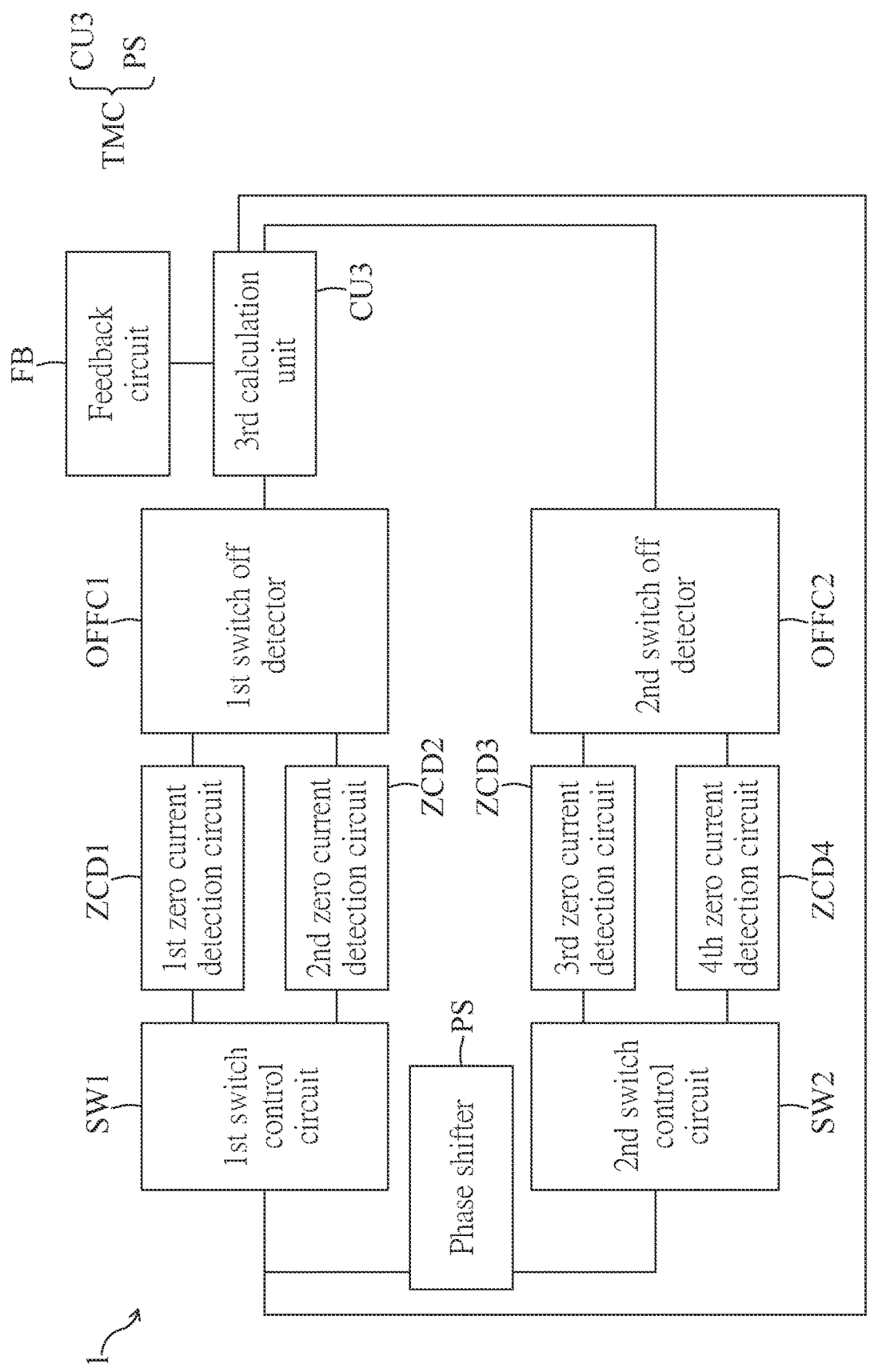
FIG. 4 is a functional block diagram of a control circuit for a power converter according to a second embodiment of the present disclosure.
Figure 5:
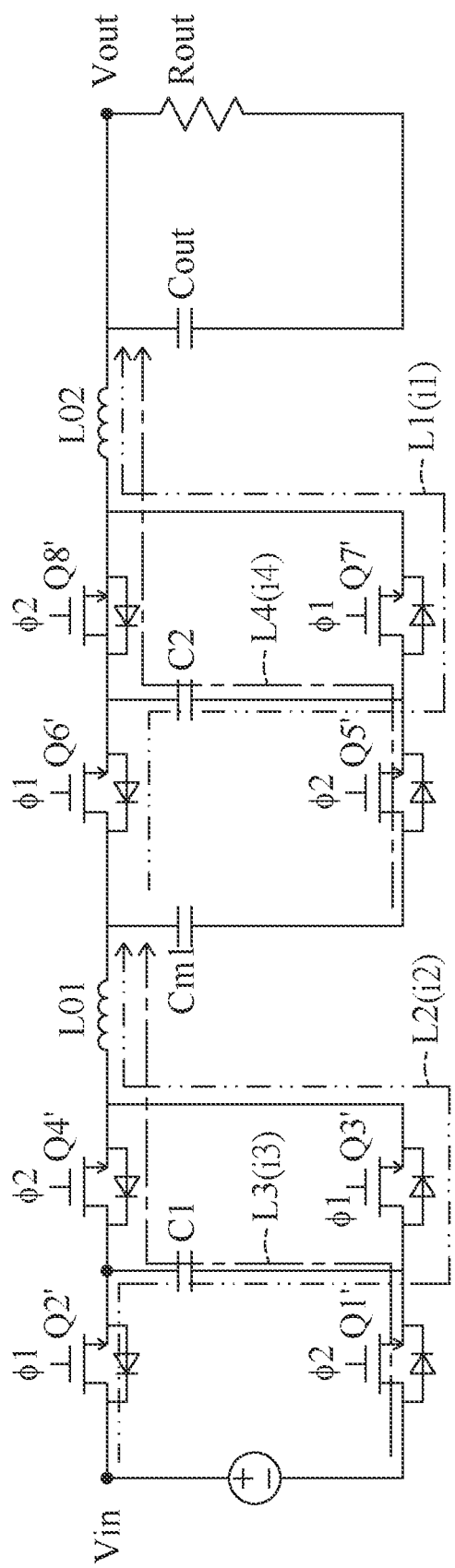
FIG. 5 is a circuit layout of the power converter according to the second embodiment of the present disclosure.

Reference is further made to FIG. 4, which is a functional block diagram of a control circuit for a power converter according to a second embodiment of the present disclosure. As shown in FIG. 4, the elements of this embodiment are basically similar to those of FIG. 1, so that part of the repeated description will be omitted. The difference is that the modulation time calculation module TMC of this embodiment includes a third calculation unit CU3 and a phase shifter PS. The following is a description with reference to FIGS. 5 and 6. FIG. 5 is a circuit layout of a power converter according to the second embodiment of the present disclosure, and FIG. 6 is a switch timing diagram according to the second embodiment of the present disclosure.

As shown in FIG. 5, the power converter can be a resonant switched capacitor converter (ReSC), which includes a two-stage resonant tank and switches Q1' to Q8' arranged between an input terminal Vin and an output terminal Vout, and an output capacitor Cout and an output resistor Rout connected to the output terminal Vout. The switches Q1' to Q8' can respectively correspond to the first mode Φ1 and the second mode Φ2, and the input terminal Vin receives an input voltage. The first-stage resonant tank can include a resonant capacitor C1 and a resonant inductor L01. The second-stage resonant tank can include a resonant capacitor C2 and a resonant inductor L02. A non-resonant capacitor Cm1 is separate from the two-stage resonant tank, and is a capacitor that does not contribute to characteristic resonant frequencies. In this embodiment, only one non-resonant capacitor Cm1 is included in the circuit. However, depending on topology of the ReSC circuit, more than one non-resonant capacitor can be used.

Among the switches Q1' to Q8', the switches Q2', Q3', Q6', and Q7' correspond to the first mode Φ1, and the switches Q1', Q4', Q5', and Q8' correspond to the second mode Φ2.

Figure 6:
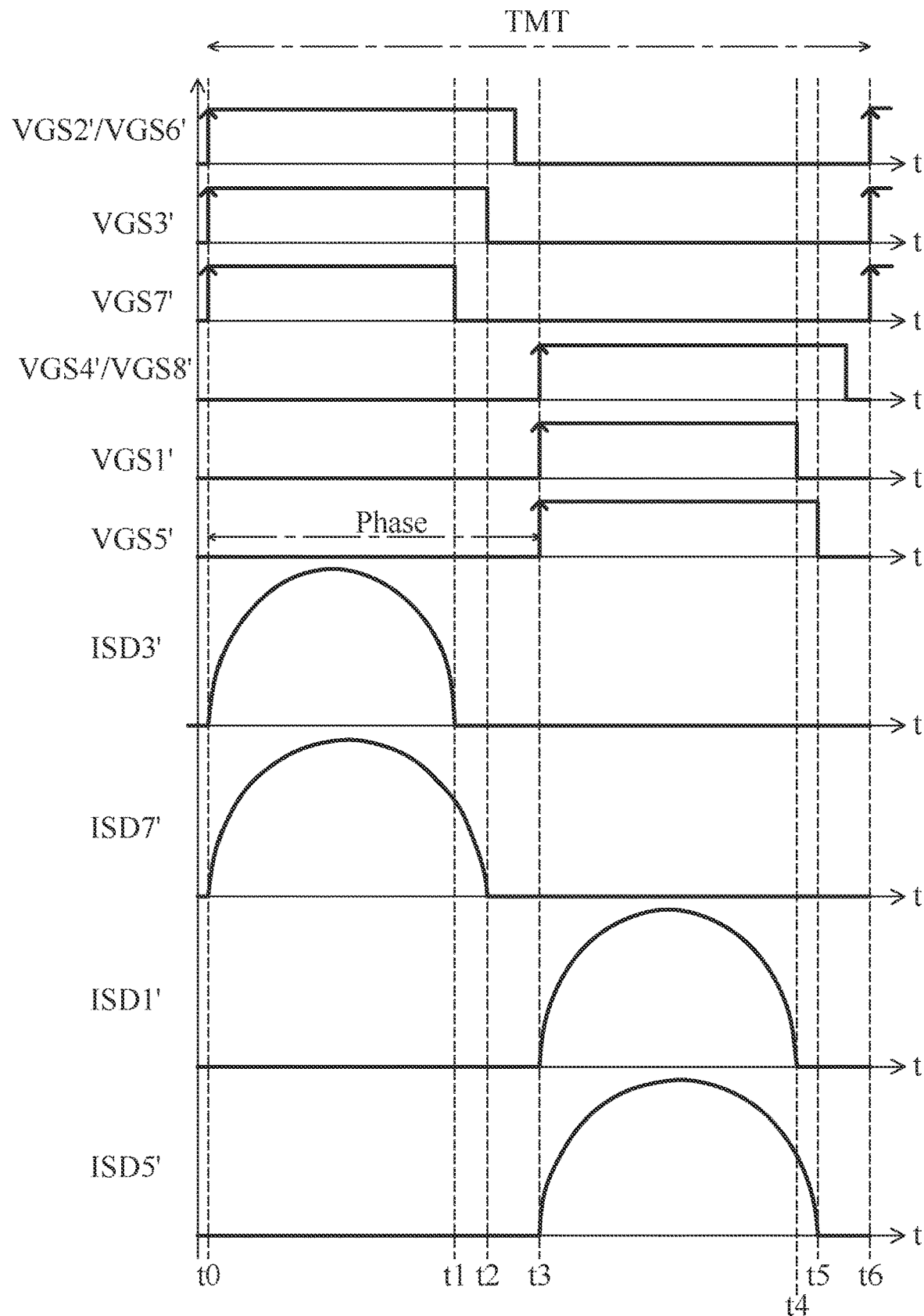
FIG. 6 is a switch timing diagram according to the second embodiment of the present disclosure.

As shown in FIG. 6, the first mode Φ1 starts at time t0, and the first switch control circuit SW1 is configured to control the plurality of switches corresponding to the first mode Φ1 to be turned on in the first mode Φ1. For example, the switches Q2', Q3', Q6', and Q7' are respectively controlled by the switch signals VGS2', VGS3', VGS6', and VGS7', and the switches Q1', Q4', Q5' and Q8' corresponding to the second mode Φ2 are controlled by switch signals VGS1', VGS4', VGS5', and VGS8'. In this case, the first resonant current i1 along the first resonant path L1 and the second resonant current i2 along the second resonant path L2 can be respectively formed by the two-stage resonant tank.

The switches Q2', Q3', Q6', and Q7' include a first rectifier switch located on the first resonance path L1, and a second rectifier switch located on the second resonance path L2. For example, it can be seen from FIG. 6 that the body diodes of the switches Q7' and Q3' follow a direction of the current, which therefore have rectification functions and can be used as the aforementioned first rectifier switch and second rectifier switch, respectively.

Next, the first zero current detection circuit ZCD1 is configured to detect the first resonant current i2 on the first rectifier switch (the switch Q3' at this time), in other words, to detect a switch current ISD3' on the switch Q3'. In response to the first resonant current i2 (i.e., the switch current ISD3') being detected to reach zero amp, the first zero current detection circuit ZCD1 outputs a first zero current signal to enable the first switch control circuit SW1 to control the first rectifier switch (switch Q3') to be turned off, and it is at time t1.

At the same time, when the second resonant path L1 is generated, the second zero current detection circuit ZCD2 is also configured to detect the second resonant current i1 on the second rectifier switch (in this case, the switch Q7'), in other words, to detect a switch current ISD7' on the switch Q7'. In response to the second resonant current i1 being detected to reach zero amp, the second zero current detection circuit ZCD2 outputs a second zero current signal to enable the first switch control circuit SW1 to control the second rectifier switch (switch Q7') to be turned off, and it is at time t2.

Further, the first switch off detector OFFC1 is configured to detect whether or not the first rectifier switch and the second rectifier switch are both turned off. At time t2, when it is detected that both the first rectifier switch (switch Q7') and the second rectifier switch (switch Q3') are turned off, the first turn-off confirmation signal is outputted.

As shown in FIG. 4, the third calculation unit CU3 is respectively connected to the first switch control circuit SW1, the feedback circuit FB, the first switch off detector OFFC1, and the second switch off detector OFFC2. The phase shifter PS is connected between the third calculation unit CU3 and the second switch control circuit SW2.

The third calculation unit CU3 can be used to receive the first turn-off confirmation signal and the second turn-off confirmation signal. The third calculation unit CU3 is configured to calculate a total modulation time TMT according to the feedback voltage.

In more detail, the third calculation unit CU3 continuously calculates and updates the total modulation time TMT according to the feedback voltage, and samples the total modulation time TMT calculated at the time when the switches Q2', Q3', Q6', and Q7' corresponding to the first mode Φ1 are turned on, take one half of the total modulation time TMT as a time point at which the switches Q1', Q4', Q5', and Q8' corresponding to the second mode Φ2 are turned on, take the total modulation time TMT as a time point at which the switches Q2', Q3', Q6', and Q7 corresponding to the first mode Φ1 are turned on to enter the first mode Φ1 of the next cycle, and correspondingly generate a time modulation signal.

The phase shifter PS is configured to, in response to receiving the time modulation signal, generate a phase shifted control signal according to one-half of the total modulation time (for example, phase amount Phase as shown in FIG. 6) as the second mode activation signal, to turn on the switches Q1', Q4', Q5', and Q8' corresponding to the second mode Φ2 after the switches Q2', Q3', Q6', and Q7 corresponding to the first mode Φ1 are turned on and the half of the total modulation time elapses, and after the third calculation unit CU3 receives the first turn-off confirmation signal.

Further, the phase shifter PS is configured to, in response to receiving the time modulation signal, phase-shift the time modulation signal according to one-half of the total modulation time TMT, for example, a phase shift amount Phase as shown in the FIG. 6, to generate a phase shifted time modulation signal, and use the time modulation signal and the phase shifted time modulation signal to be output as the second mode activation signal and the first mode activation signal, respectively.

In other words, different from the foregoing embodiment, a start time of the second mode Φ2 is essentially controlled by the phase shifter PS, that is, a switching cycle time of the first mode Φ1 (that is, the first mode activation signal) is phased shifted by 180 degrees. Therefore, at time t3, the switches Q1', Q4', Q5', and Q8' corresponding to the second mode Φ2 can be triggered by outputting the second mode activation signal.

In the second mode Φ2, the second switch control circuit SW2 is configured to, in response to receiving the second mode activation signal, control the switches Q1', Q4', Q5', and Q8' corresponding to the second mode D2 to be turned on, to respectively form the third resonance current i3 along the third resonance path L3 and the fourth resonance current i4 along the fourth resonance path L4 through the resonant tanks. Similarly, the switches Q1', Q4', Q5', and Q8' include a third rectifier switch (in this case, switch Q1') located on the third resonant path L3 and a fourth rectifier switch (switch Q5' at this time) located on the fourth resonant path L4.

Next, the third zero current detection circuit ZCD3 is configured to detect the third resonant current i3 on the third rectifier switch (the switch Q1'), in other words, to detect a switch current ISD1' on the switch Q1'. In response to the third resonant current i3 (i.e., the switch current ISD1') being detected to reach zero amp, the third zero current detection circuit ZCD3 outputs a third zero current signal to enable the second switch control circuit SW2 to control the third rectifier switch (switch Q1') to be turned off, and it is at time t4.

At the same time, when the fourth resonant path L4 is generated, the fourth zero current detection circuit ZCD4 is configured to detect a fourth resonant current i4 (that is, the switch current ISD5') on the fourth rectifier switch (switch Q5'). In response to the fourth resonant current i4 (switching current ISD5') being detected to reach zero amp, the fourth zero current detection circuit ZCD4 outputs a fourth zero current signal to enable the second switch control circuit SW2 to control the fourth rectifier switch (switch Q5') to be turned off, and it is at time t5.

The second switch off detector OFFC2 is configured to detect whether or not the third rectifier switch and the fourth rectifier switch are both turned off. When the third rectifier switch and the fourth rectifier switch are both turned off, a second turn-off confirmation signal is outputted. At time t5, when it is detected that both the third rectifier switch (switch Q1') and the fourth rectifier switch (switch Q5') are turned off, the second turn-off confirmation signal is outputted.

Next, the third calculation unit CU3 is further configured to use the time modulation signal as the first mode activation signal after the switches corresponding to the switches Q2', Q3', Q6', and Q7 corresponding to the first mode (D1 are turned on and the total modulation time TMT elapses, and after the third calculation unit CU3 receives the second turn-off confirmation signal, to turn on the switches Q2', Q3', Q6', and Q7 corresponding to the first mode (D1 to enter the first mode of the next cycle (for example, at time t6).

Beneficial Effects of the Embodiments

In conclusion, the control circuit and the control method for the power converter provided by the present disclosure can enable rectifier switches of a power converter with multiple sets of rectification paths to determine on-times individually through the zero current detection circuits. The control circuit and the control method provided by the present disclosure can not only overcome difference in on-times of the rectifier switches caused by the component error of individual rectifier loop, but can also achieve functions of zero voltage turned on and zero current turned off for each of the rectifier components, thereby optimizing an overall efficiency of the power converter.

In addition, after ensuring that all rectification paths of the power converter have completed zero current turn-off, trigger timings of the switching signals of the power converter are adjusted to achieve modulation of the converter output impedance, thereby providing functions of output voltage adjustment and current-sharing for parallel output.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A control method for a power converter including a plurality of resonant tanks and a plurality of switches arranged between an input terminal and an output terminal, the plurality of switches corresponding to a first mode and a second mode, respectively, the input terminal receiving an input voltage, and the control method comprising:

configuring a first switch control circuit to control the plurality of switches corresponding to the first mode to be turned on in the first mode, so as to form a first resonant current along a first resonant path and a second resonant current along a second resonant path through the plurality of resonant tanks, respectively, wherein the plurality of switches include a first rectifier switch located on the first resonant path and a second rectifier switch located on the second resonant path;

configuring a first zero current detection circuit to detect the first resonant current on the first rectifier switch, and output, in response to detecting that the first resonant current reaches zero amp, a first zero current signal to enable the first switch control circuit to control the first rectifier switch to be turned off;

configuring a second zero current detection circuit to detect the second resonant current on the second rectifier switch, and output, in response to detecting that the second resonant current reaches zero amp, a second zero current signal to enable the first switch control circuit to control the second rectifier switch to be turned off;

configuring a first switch off detector to detect whether or not the first rectifier switch and the second rectifier switch are both turned off, and output, in response to the first rectifier switch and the second rectifier switch being both turned off, a first turn-off confirmation signal;

configuring a modulation time calculation module to calculate a first modulation time according to a feedback voltage from the output terminal;

configuring the modulation time calculation module to, in response to receiving the first turn-off confirmation signal, output a second mode activation signal after the first rectifier switch and the second rectifier switch are turned off and the first modulation time has elapsed;

configuring a second switch control circuit to, in response to receiving the second mode activation signal, control the plurality of switches corresponding to the second mode to be turned on, so as to form a third resonant current along a third resonant path and a fourth resonant current along a fourth resonant path through the plurality of resonant tanks, respectively, wherein the plurality of switches include a third rectifier switch located on the third resonant path and a fourth rectifier switch located on the fourth resonant path;

configuring a third zero current detection circuit to detect the third resonant current on the third rectifier switch, and output, in response to detecting that the third resonant current reaches zero amp, a third zero current signal to enable the second switch control circuit to control the third rectifier switch to be turned off;

configuring a fourth zero current detection circuit to detect the fourth resonant current on the fourth rectifier switch, and output, in response to detecting that the fourth resonant current reaches zero amp, a fourth zero current signal to enable the second switch control circuit to control the fourth rectifier switch to be turned off;

configuring a second switch off detector to detect whether or not the third rectifier switch and the fourth rectifier switch are both turned off, and output, in response to the third rectifier switch and the fourth rectifier switch being both turned off, a second turn-off confirmation signal;

configuring the modulation time calculation module to calculate a second modulation time according to the feedback voltage from the output terminal; and configuring the modulation time calculation module to, in response to receiving the second turn-off confirmation signal, output a first mode activation signal after the third rectifier switch and the fourth rectifier switch are turned off and the second modulation time has elapsed.

2. The control method according to claim 1, further comprising:
configuring the first switch control circuit to, in response to receiving the first turn-off confirmation signal, control the switches other than the first rectifier switch and the second rectifier switch among the plurality of switches corresponding to the first mode to be turned off within the first modulation time after the first rectifier switch and the second rectifier switch are turned off.

3. The control method according to claim 1, further comprising:
configuring the second switch control circuit to, in response to receiving the second turn-off confirmation signal, control the switches other than the third rectifier switch and the fourth rectifier switch among the plurality of switches corresponding to the second mode to be turned off within the second modulation time after the third rectifier switch and the fourth rectifier switch are turned off.

4. The control method according to claim 1, wherein the modulation time calculation module includes a first calculation unit and a second calculation unit, and the control method further comprises:
configuring the first calculation unit to calculate the first modulation time according to the feedback voltage, and output, in response to receiving the first turn-off confirmation signal, the second mode activation signal after the first rectifier switch and the second rectifier switch are turned off and the first modulation time has elapsed; and
configuring the second calculation unit to calculate the second modulation time according to the feedback voltage, and output, in response to receiving the second turn-off confirmation signal, the first mode activation signal after the third rectifier switch and the fourth rectifier switch are turned off and the second modulation time has elapsed.

5. The control method according to claim 1, wherein the modulation time calculation module includes a third calculation unit and a phase shifter, and the control method further comprises:
configuring the third calculation unit to:
continuously calculate and update a total modulation time based on the feedback voltage; and
sample the total modulation time calculated when the switches corresponding to the first mode are turned on, take one-half of the total modulation time as a time point at which the switches corresponding to the second mode are turned on, take the total modulation time as a time point at which the switches corresponding to the first mode are turned on to enter the first mode of a next cycle, and correspondingly generate a time modulation signal;
configuring the phase shifter to, in response to receiving the time modulation signal, generate a phase shifted control signal according to one-half of the total modulation time as the second mode activation signal, to turn on the switches corresponding to the second mode after the switches corresponding to the first mode are turned on and the half of the total modulation time elapses, and after the third calculation unit receives the first turn-off confirmation signal; and
configuring the third calculation unit to use the time modulation signal as the first mode activation signal after the switches corresponding to the switches corresponding to the first mode are turned on and the total modulation time elapses, and after the third calculation unit receives the second turn-off confirmation signal, to turn on the switches corresponding to the first mode to enter the first mode of the next cycle.

6. A control circuit for a power converter including a plurality of resonant tanks and a plurality of switches arranged between an input terminal and an output terminal, the plurality of switches corresponding to a first mode and a second mode, respectively, the input terminal receiving an input voltage, and the control circuit comprising:
a first switch control circuit configured to control the plurality of switches corresponding to the first mode to be turned on in the first mode, so as to form a first resonant current along a first resonant path and a second resonant current along a second resonant path through the plurality of resonant tanks, respectively, wherein the plurality of switches include a first rectifier switch located on the first resonant path and a second rectifier switch located on the second resonant path;
a first zero current detection circuit configured to detect the first resonant current on the first rectifier switch, and output, in response to detecting that the first resonant current reaches zero amp, a first zero current signal to enable the first switch control circuit to control the first rectifier switch to be turned off;
a second zero current detection circuit configured to detect the second resonant current on the second rectifier switch, and output, in response to detecting that the second resonant current reaches zero amp, a second zero current signal to enable the first switch control circuit to control the second rectifier switch to be turned off;
a first switch off detector configured to detect whether or not the first rectifier switch and the second rectifier switch are both turned off, and output, in response to the first rectifier switch and the second rectifier switch being both turned off, a first turn-off confirmation signal;
a modulation time calculation module configured to calculate a first modulation time according to a feedback voltage from the output terminal, and output, in response to receiving the first turn-off confirmation signal, a second mode activation signal after the first rectifier switch and the second rectifier switch are turned off and the first modulation time has elapsed;
a second switch control circuit configured to, in response to receiving the second mode activation signal, control the plurality of switches corresponding to the second mode to be turned on, so as to form a third resonant current along a third resonant path and a fourth resonant current along a fourth resonant path through the plurality of resonant tanks, respectively, wherein the plurality of switches include a third rectifier switch located on the third resonant path and a fourth rectifier switch located on the fourth resonant path;
a third zero current detection circuit configured to detect the third resonant current on the third rectifier switch, and output, in response to detecting that the third resonant current reaches zero amp, a third zero current signal to enable the second switch control circuit to control the third rectifier switch to be turned off;
a fourth zero current detection circuit configured to detect the fourth resonant current on the fourth rectifier switch, and output, in response to detecting that the second resonant current reaches zero amp, a fourth zero current signal to enable the second switch control circuit to control the fourth rectifier switch to be turned off; and
a second switch off detector configured to detect whether or not the third rectifier switch and the fourth rectifier switch are both turned off, and output, in response to the third rectifier switch and the fourth rectifier switch being both turned off, a second turn-off confirmation signal;
wherein the modulation time calculation module configured to calculate a second modulation time according to the feedback voltage from the output terminal, and output, in response to receiving the second turn-off confirmation signal, a first mode activation signal after the third rectifier switch and the fourth rectifier switch are turned off and the second modulation time has elapsed.

7. The control circuit according to claim 6, wherein the first switch control circuit is further configured to, in response to receiving the first turn-off confirmation signal, control the switches other than the first rectifier switch and the second rectifier switch among the plurality of switches corresponding to the first mode to be turned off within the first modulation time after the first rectifier switch and the second rectifier switch are turned off.

8. The control circuit according to claim 6, wherein the second switch control circuit is further configured to, in response to receiving the second turn-off confirmation signal, control the switches other than the third rectifier switch and the fourth rectifier switch among the plurality of switches corresponding to the second mode to be turned off within the second modulation time after the third rectifier switch and the fourth rectifier switch are turned off.

9. The control circuit according to claim 6, wherein the modulation time calculation module includes a first calculation unit and a second calculation unit, and the first calculation unit is configured to calculate the first modulation time according to the feedback voltage, and output, in response to receiving the first turn-off confirmation signal, the second mode activation signal after the first rectifier switch and the second rectifier switch are turned off and the first modulation time has elapsed;
wherein the second calculation unit is configured to calculate the second modulation time according to the feedback voltage, and output, in response to receiving the second turn-off confirmation signal, the first mode activation signal after the third rectifier switch and the fourth rectifier switch are turned off and the second modulation time has elapsed.

10. The control circuit according to claim 6, wherein the modulation time calculation module includes a third calculation unit and a phase shifter, and the third calculation unit is configured to continuously calculate and update a total modulation time based on the feedback voltage, sample the total modulation time calculated when the switches corresponding to the first mode are turned on, take one-half of the total modulation time as a time point at which the switches corresponding to the second mode are turned on, take the total modulation time as a time point at which the switches corresponding to the first mode are turned on to enter the first mode of a next cycle, and correspondingly generate a time modulation signal;
wherein the phase shifter is configured to, in response to receiving the time modulation signal, generate a phase shifted control signal according to one-half of the total modulation time as the second mode activation signal, to turn on the switches corresponding to the second mode after the switches corresponding to the first mode are turned on and the half of the total modulation time elapses, and after the third calculation unit receives the first turn-off confirmation signal, and wherein the third calculation unit is further configured to use the time modulation signal as the first mode activation signal after the switches corresponding to the switches corresponding to the first mode are turned on and the total modulation time elapses, and after the third calculation unit receives the second turn-off confirmation signal, to turn on the switches corresponding to the first mode to enter the first mode of the next cycle.

\* \* \* \* \*